United States Patent [19]

Saito et al.

[11] Patent Number: 4,523,242
[45] Date of Patent: Jun. 11, 1985

[54] MAGNETIC HEAD ADJUSTING APPARATUS

[75] Inventors: Shoichi Saito; Kazumi Miyazi, both of Tokyo, Japan

[73] Assignee: Olympus Optical Co., Ltd., Tokyo, Japan

[21] Appl. No.: 408,442

[22] Filed: Aug. 16, 1982

[30] Foreign Application Priority Data

Aug. 25, 1981 [JP] Japan .......................... 56-125574[U]

[51] Int. Cl.$^3$ ............................................. G11B 21/24
[52] U.S. Cl. ..................................................... 360/109
[58] Field of Search ......................................... 360/109

[56] References Cited

U.S. PATENT DOCUMENTS 4,158,868 6/1979 Jenkins ................................. 360/109

FOREIGN PATENT DOCUMENTS 50-114221 9/1979 Japan .................................. 360/109
WO80/00890 10/1979 PCT Int'l Appl. ................. 360/109

Primary Examiner—A. J. Heinz
Attorney, Agent, or Firm—Frishauf, Holtz, Goodman & Woodward

[57] ABSTRACT

A magnetic head adjusting apparatus includes a base, an auxiliary base disposed over the base for supporting a magnetic head, and a first adjusting screw threadably engaged with the base to contact with its end face the surface of the auxiliary base which faces the base. The first adjusting screw moves in a direction perpendicular to the base to move the auxiliary base in the same direction, and engages the auxiliary base to support it so that the auxiliary base can rotate around the first adjusting screw axis. Second and third adjusting screws threadably engage the base at different positions to abut the surface of the auxiliary base which faces the base, and move in the direction perpendicular to the base to move the auxiliary base in the same direction. A rotating member is mounted for rotation relative to the base, and is coupled with the auxiliary base at a position offset from the axis of rotation of the rotating member relative to the base. Accordingly, the auxiliary base is rotated around the first adjusting member as the rotating member is correspondingly rotated, to adjust the magnetic head gap relative to a tape in a tape cassette next to the auxiliary base.

2 Claims, 4 Drawing Figures

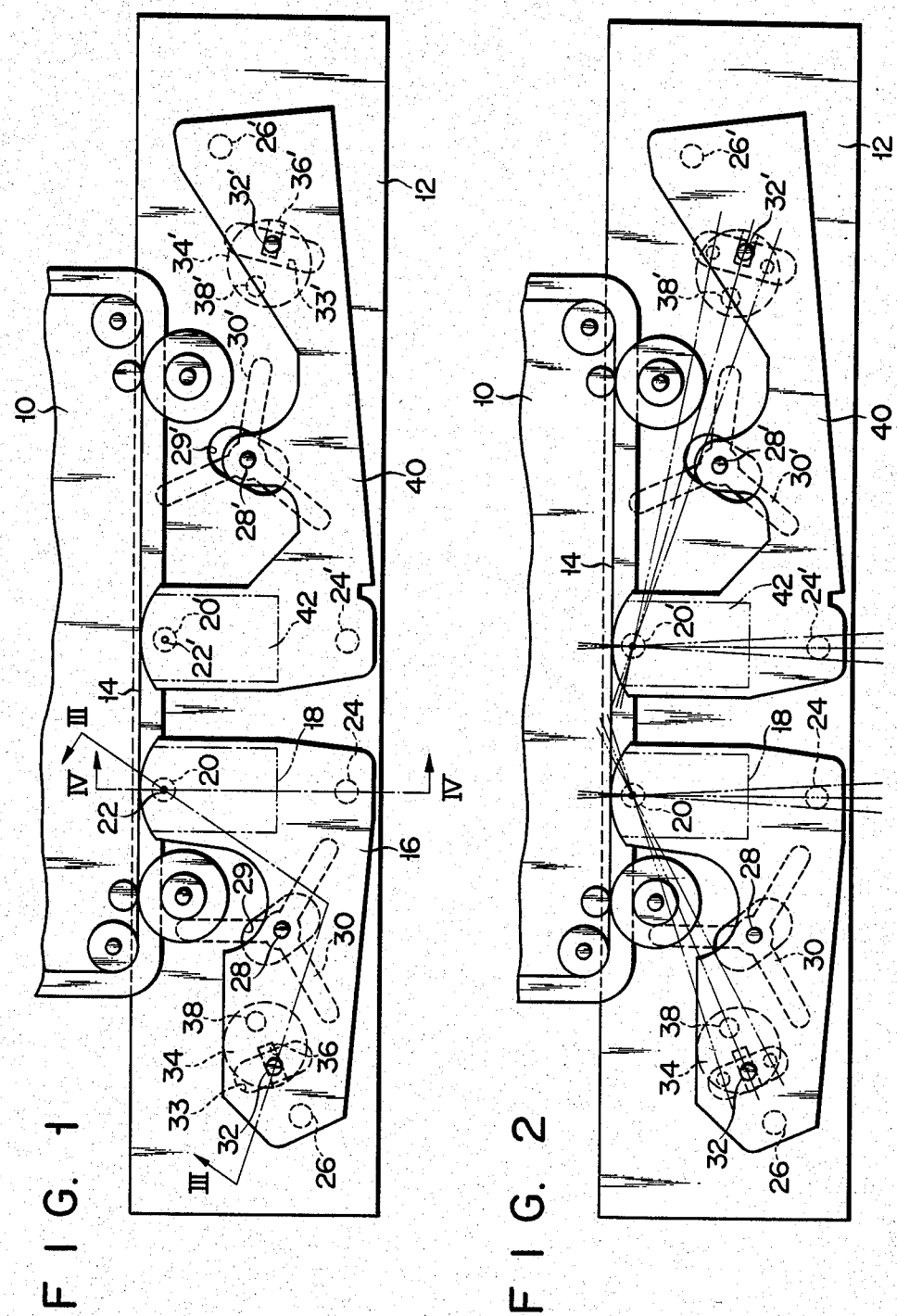

MAGNETIC HEAD ADJUSTING APPARATUS

BACKGROUND OF THE INVENTION

This invention relates to a magnetic head adjusting apparatus for adjusting the position of a magnetic head relative to a magnetic tape by means of a plurality of screws, thereby holding the magnetic head against the magnetic tape in fixed positions.

In a conventional magnetic head adjusting apparatus, a magnetic head is fixed to a magnetic head fixing base, which is coupled to a chassis by means of two to four screws.

The chassis can move between a first position where the magnetic head is in contact with a magnetic tape, and a second position where the magnetic head is kept apart from the magnetic tape.

The height, tilt, and azimuth of the magnetic head can be adjusted by individually turning the two to four screws.

In the conventional magnetic head adjusting apparatus as mentioned above, however, it is impossible to adjust the gap direction angle of the magnetic head to the magnetic tape.

SUMMARY OF THE INVENTION

This invention is contrived in consideration of these circumstances, and is intented to provide a magnetic head adjusting apparatus of a simple construction capable of fine adjustment of the height, tilt, azimuth, and gap direction of magnetic heads.

The above object of this invention may be attained by a magnetic head adjusting apparatus which comprises a base, an auxiliary base disposed along the base and supporting a magnetic head, and a first adjusting member attached to the base to be in contact with that surface of the auxiliary base which faces the base. The first adjusting member moves in a direction to intersect the base to move the auxiliary base in the same direction and is rotatably coupled with the auxiliary base to support the auxiliary base so that the auxiliary base can rotate around the first adjusting member along the base. A second adjusting member is attached to the base at a position off the first adjusting member to be in contact with that surface of the auxiliary base which faces the base, and moves in the direction to intersect the base to move the auxiliary base in the same direction. A third adjusting member is attached to the base at a position off the first and second adjusting members to be in contact with that surface of the auxiliary base which faces the base so that the first, second and third adjusting members form the three vertexes of a triangle, and move in the direction to intersect the base to move the auxiliary base in the same direction. A rotating member is rotatably mounted on the base and coupled with that portion of the auxiliary base which is off the first adjusting member at a position off the axis of rotation of the rotating member relative to the base, so that the auxiliary base is rotated in one and the other directions around the first adjusting member as the rotating member rotates in one and the other directions.

In the magnetic head adjusting apparatus of this invention, the first to third adjusting members are preferably screws.

With this construction, the first to third adjusting members are simple in construction and low in cost.

Preferably, moreover, the magnetic head adjusting apparatus of this invention further comprises urging means for bringing the base and the auxiliary base close to each other.

With this construction, the magnetic head adjusting apparatus can operate properly without regard to the posture of an apparatus which uses the magnetic head adjusting apparatus.

Preferably, in the magnetic head adjusting apparatus of this invention, the first adjusting member is a screw having a pin on the top, the auxiliary base has a conical opening extending outward from that surface of the auxiliary base which faces the base in the moving direction of the first adjusting member leaving the base, and in contact with the pin of the first adjusting member at the top, and the second and third adjusting members are screws.

With this construction, the first to third adjusting members, as well as a mechanism for coupling the first adjusting member and the auxiliary base, are simple in construction, and the magnetic head adjusting apparatus can be operated smoothly without requiring any great force.

BRIEF DESCRIPTION OF THE DRAWINGS

FIG. 1 is a plan view of a magnetic head adjusting apparatus according to an embodiment of this invention;

FIG. 2 is a plan view similar to FIG. 1 for illustrating gap direction adjustment of magnetic heads;

DETAILED DESCRIPTION OF THE PREFERRED EMBODIMENT

Figure 3:
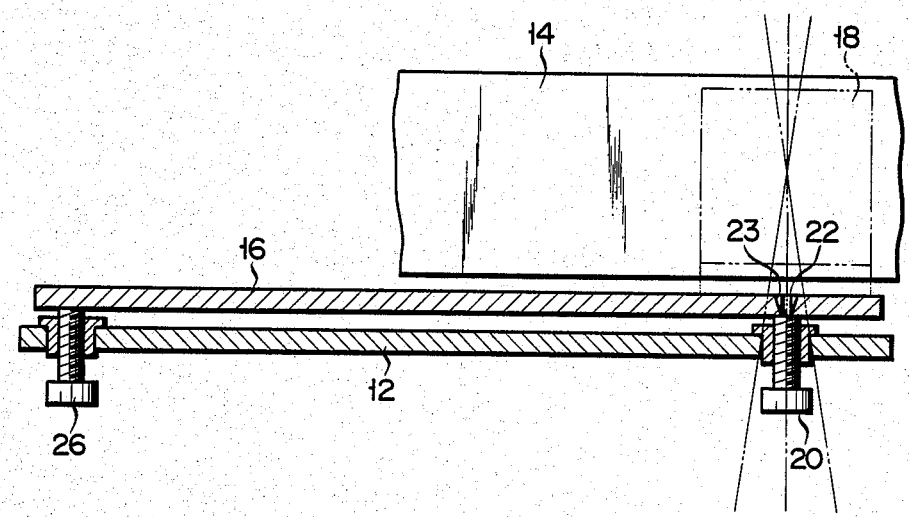
FIG. 3 is a sectional view taken along line III—III of FIG. 1 for illustrating azimuth adjustment.

FIG. 1 shows a magnetic head adjusting apparatus according to an embodiment of this invention.

In this embodiment, the magnetic head adjusting apparatus is used in a tape recorder. The tape recorder has reel shafts (not shown) mounted individually on reel hubs (not shown) of a tape cassette 10. The housing of the tape cassette 10 has a pair of major faces which rotatably sustain the reel hubs. The magnetic head adjusting apparatus according to this embodiment has a moving base 12 arranged substantially parallel to the major faces of the tape cassette 10, that is, to the drawing plane of FIG. 1. The moving base 12 is mounted on a chassis (not shown) by suitable conventional guide means, such as a combination of a guide pin and a guide hole in which the guide pin is fitted. Thus, the moving base 12 is allowed to move between a first position as shown in FIG. 1, and a second position off the housing of the tape cassette 10 and below the first position while it is kept parallel to the major faces of the tape cassette 10. The moving base 12 moves at right angles to those portions of a magnetic tape 14 which are in contact with magnetic heads or exposed through magnetic head-pinch roller insertion openings in the housing of the tape cassette 10.

As shown in FIG. 1, a first auxiliary base 16 is disposed along the front of the moving base 12. A first magnetic head 18 is attached to the front of the first auxiliary base 16. The first magnetic head 18 is inserted in one of the magnetic head-pinch roller insertion openings of the housing of the tape cassette 10 to be in contact with the magnetic tape 14.

A first adjusting member 20 is attached to the moving base 12. The first adjusting member 20 can move along the thickness of the moving base 12 which intersects the moving direction of the base 12 at right angles. In this embodiment, the first adjusting member 20 is formed of a screw which is screwed in the moving base 12, and can move at right angles to the drawing plane of FIG. 1.

Figure 4:
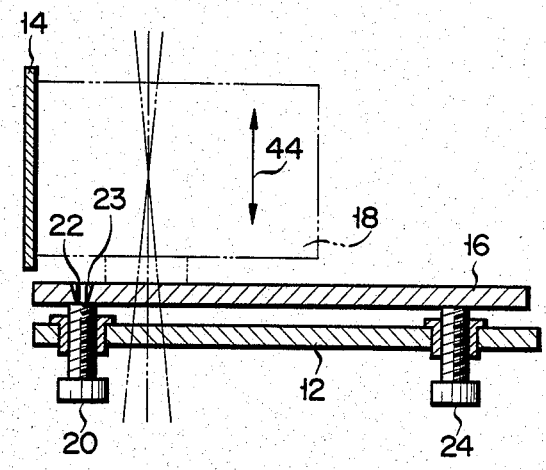
FIG. 4 is a sectional view taken along line IV—IV of FIG. 1 for illustrating tilt and height adjustment.

A pin 22 extends forward from the front end face of the first adjusting member 20 to be inserted in an opening 23 formed in the moving base 12, as shown in FIGS. 3 and 4. Thus, the first auxiliary base 16 can rotate around the pin 22 of the first adjusting member 20 along the front of the moving base 12.

As shown in FIGS. 3 and 4, the opening 23 includes a conical countersink portion formed in the front of the first auxiliary base 16.

As shown in FIG. 1, the moving base 12 is provided with a second adjusting member 24 located below the first adjusting member 20. The second adjusting member 24 can move along the thickness of the moving base 12.

In this embodiment, the second adjusting member 24 is formed of a screw which is screwed in the moving base 12, and can move at right angles to the drawing plane of FIG. 1, like the first adjusting member 20. The front end of the second adjusting member 24 abuts against the back of the first auxiliary base 16, as shown in FIG. 4.

As shown in FIG. 1, the moving base 12 is also provided with a third adjusting member 26 located off the first and second adjusting members 20 and 24.

The third adjusting member 26 can move along the thickness of the moving base 12.

In this embodiment, the third adjusting member 26 is formed of a screw which is screwed in the moving base 12, and can move at right angles to the drawing plane of FIG. 1, like the first and second adjusting members 20 and 24. The front end of the third adjusting member 26 abuts against the back of the first auxiliary base 16, as shown in FIG. 3.

The respective front ends of the first to third adjusting members 20, 24 and 26 form the three vertexes of a triangle to support the first auxiliary base 16.

As shown in FIG. 1, a first pin 28 protrudes backward from the first auxiliary base 16 to be inserted in a first opening 29 formed in the moving base 12. The first auxiliary base 16 is urged toward the moving base 12 by conventional urging means 30, such as a leaf spring, which is attached to the rear end of the first pin 28. Even if the direction of the force of gravity acting on the first auxiliary base 16 varies, the respective front ends of the first to third adjusting members 20, 24 and 26 are always kept in contact with the back of the first auxiliary base 16.

A second pin 32 protrudes backward from the first auxiliary base 16 to be inserted in a second opening 33 formed in the moving base 12.

The rear end of the second pin 32 is passed through a slit 36 formed in a rotating member 34 which is rotatably attached to the back of the moving base 12. The rear end of the second pin 32 is off the rotation axis 38 of the rotating member 34.

In this embodiment, a second auxiliary base 40 is disposed along the moving base 12.

A second magnetic head 42 is attached to the front of the second auxiliary base 40. The second magnetic head 42 is inserted in another of the magnetic head-pinch roller insertion openings of the housing of the tape cassette 10 to be in contact with the magnetic tape 14.

Like the first auxiliary base 16, the second auxiliary base 40 is supported at three points by the respective front ends of first to third adjusting members 20', 24' and 26'. The second auxiliary base 40 is urged toward the moving base by urging means 30' attached to the rear end of a pin 28' which is fixed to the back of the second auxiliary base 40 and inserted in an opening 29' in the moving base 12. Also, the second auxiliary base 40 has a second pin 32' inserted in a slit 36' of a rotating member 34' which is rotatably attached to the back of the moving base 12.

In the magnetic head adjusting apparatus of the aforementioned construction, if the rotating member 34 and 34' are turned clockwise or counterclockwise by conventional rotating means, such as a screwdriver, to move the second pins 32 and 32' of the first and second auxiliary bases 16 and 40 up or down, the first and second auxiliary bases 16 and 40 rotate clockwise or counterclockwise around the pins 22 and 22' of the first adjusting members 20 and 20' along the front of the moving base 12. Thus, the gap directions of the first and second magnetic heads 18 and 42 can be adjusted between neutral positions indicated by dashed lines and positions indicated by two-dot chain lines, as shown in FIG. 2.

If the third adjusting member 26 is moved forward or backward by a screwdriver or any other suitable conventional rotating means to move forward or backward the contact portion of the first auxiliary base 16 on the third adjusting member 26, the first auxiliary base 16 rotates forward or backward around the respective front ends of the first and second adjusting members 20 and 24. Thus, the azimuth of the first magnetic head 18 can be adjusted between a neutral position indicated by a dashed line and positions indicated by two-dot chain lines, as shown in FIG. 3.

The azimuth of the second magnetic head 42 of the second magnetic head 40 can be adjusted in the same manner.

If one of the first and second adjusting members 20 and 24 is moved forward or backward by a screwdriver or other conventional rotating means to move the contact portion of the first auxiliary base 16 on the first or second adjusting member 20 or 24 forward or backward, the first auxiliary base 16 rotates forward or backward around the front end of the other of the first and second adjusting members 20 and 24 and the front end of the third adjusting member 26. Thus, the tilt of the first magnetic head 18 can be adjusted between a neutral position indicated by a dashed line and positions indicated by two-dot chain lines, as shown in FIG. 4.

If all of the first to third adjusting members 20, 24 and 26 are moved forward or backward moving the contact portions of the first auxiliary base 16 on the first to third adjusting members 20, 24 and 26 forward or backward, the first auxiliary base 16 also moves forward or backward. Thus, the height of the first magnetic head 18 can be adjusted as indicated by an arrow 44 in FIG. 4.

The height of the second magnetic head 42 of the second auxiliary base 40 can be adjusted in the same manner.

Although an illustrative embodiment of this invention has been described in detail herein, it is to be understood that the invention is not limited to that embodiment, and that various changes and modifications may be effected therein by one skilled in the art without departing from the scope or spirit of the invention.

For example, the base may be a fixed base.

What we claim is:

1. A magnetic head adjusting apparatus comprising:
a generally planar base;
a generally planar auxiliary base disposed to extend over the base for supporting a magnetic head;
a first adjusting member engaged with the base to be in contact with a surface of the auxiliary base which faces the base, said first adjusting member being arranged to move in a direction transverse of the base plane to move the auxiliary base in the same direction and coupled with the auxiliary base to support the auxiliary base for rotation around the first adjusting member;
a second adjusting member engaged with the base at a position away from the first adjusting member to be in contact with the surface of the auxiliary base which faces the base, and arranged to move in a direction transverse of the base plane to move the auxiliary base in the same direction;
a third adjusting member engaged with the base at a position away from those of the first and the second adjusting members to be in contact with the surface of the auxiliary base which faces the base so that the first, the second and the third adjusting members form three vertexes of a triangle, said third adjusting member also being arranged to move in a direction transverse of the base plane to move the auxiliary base in the same direction; and
a rotating member mounted for relative rotation on the base and coupled with a portion of the auxiliary base which is away from the first adjusting member and at a position offset from the axis of rotation of the rotating member relative to the base, so that the auxiliary base is rotated around the first adjusting member as the rotating member is rotated relative to the base;
wherein said first adjusting member is a screw having a pin on its front end face, said auxiliary base has a conical opening extending outward from the surface of the auxiliary base which faces the base in the direction in which the first adjusting member extends from the base, and the pin of the first adjusting member engages said conical opening, and said second and said third adjusting members are screws.

2. The magnetic head adjusting apparatus according to claim 1, further comprising urging means for urging the base and the auxiliary base toward to each other.

* * * * *